US009552827B2

(12) United States Patent
Johnston et al.

(10) Patent No.: US 9,552,827 B2
(45) Date of Patent: Jan. 24, 2017

(54) ECHO CONTROL THROUGH HIDDEN AUDIO SIGNALS

(71) Applicant: DOLBY LABORATORIES LICENSING CORPORATION, San Francisco, CA (US)

(72) Inventors: Craig Johnston, Sydney (AU); Dong Shi, Shanghai (CN); Xuejing Sun, Beijing (CN); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 135 days.

(21) Appl. No.: 14/409,948

(22) PCT Filed: Jun. 27, 2013

(86) PCT No.: PCT/US2013/048123
§ 371 (c)(1),
(2) Date: Dec. 19, 2014

(87) PCT Pub. No.: WO2014/004790
PCT Pub. Date: Jan. 3, 2014

(65) Prior Publication Data
US 2015/0371654 A1 Dec. 24, 2015

Related U.S. Application Data

(60) Provisional application No. 61/674,054, filed on Jul. 20, 2012.

(30) Foreign Application Priority Data

Jun. 28, 2012 (CN) .......................... 2012 1 0224441

(51) Int. Cl.
*H04B 3/20* (2006.01)
*G10L 21/0208* (2013.01)
(Continued)

(52) U.S. Cl.
CPC ....... *G10L 21/0208* (2013.01); *G10L 21/0232* (2013.01); *H04M 9/082* (2013.01); *G10L 2021/02082* (2013.01)

(58) Field of Classification Search
CPC ............. G10L 21/0208; G10L 21/0232; G10L 2021/02082; H04M 9/082
(Continued)

(56) References Cited

U.S. PATENT DOCUMENTS 6,351,531 B1 * 2/2002 Tahernezhaadi ........ H04M 1/76
379/406.01
6,622,030 B1 9/2003 Romesburg
(Continued)

FOREIGN PATENT DOCUMENTS

WO 99/41848 8/1999
WO 2011/051625 5/2011

OTHER PUBLICATIONS

Guo, M. et al "On Acoustic Feedback Cancellation Using Probe Noise in Multiple-Microphone and Single-Loudspeaker Systems" IEEE Signal Processing Letters, pp. 283-286, published on Mar. 9, 2012.
(Continued)

*Primary Examiner* — Quynh Nguyen

(57) ABSTRACT

A method (800) for determining an estimate (215, 261) of an echo path property of an electronic device (200, 250, 300, 600). The electronic device is configured to render a total audio signal using a loudspeaker (102), and the electronic device is configured to record an echo of the rendered audio signal using a microphone (103), thereby yielding a recorded audio signal (112). The method comprises inserting (801), in an inaudible manner, an auxiliary audio signal (212) into the total audio signal to be rendered; wherein the auxiliary audio signal (212) comprises a tonal audio signal at a first frequency; isolating (803) the echo of the auxiliary
(Continued)

audio signal (212) from the recorded audio signal (112); and determining (804) the estimate (215, 261) of the echo path property based on the inserted auxiliary audio signal (212) and based on the isolated echo of the auxiliary audio signal (212).

19 Claims, 5 Drawing Sheets

(51) Int. Cl.
    *H04M 9/08* (2006.01)
    *G10L 21/0232* (2013.01)
(58) Field of Classification Search
    USPC .......................................................... 381/66
    See application file for complete search history.

(56) References Cited

U.S. PATENT DOCUMENTS

| | | | |
|---|---|---|---|
| 6,700,977 | B2 | 3/2004 | Sugiyama |
| 7,062,039 | B1 | 6/2006 | Rasmusson |
| 7,212,628 | B2 | 5/2007 | Popovic |
| 7,245,710 | B1 | 7/2007 | Hughes |
| 7,450,713 | B2 | 11/2008 | Laberteaux |
| 7,693,291 | B2 | 4/2010 | Benesty |
| 7,817,797 | B2 | 10/2010 | Popovic |
| 7,860,236 | B2 | 12/2010 | Lu |
| 7,903,828 | B2 | 3/2011 | Rodman |
| 8,098,813 | B2 | 1/2012 | Sosrensen |
| 2002/0154764 | A1* | 10/2002 | Ahmad .................... H04Q 1/46 379/406.12 |
| 2007/0058799 | A1* | 3/2007 | Sudo ...................... H04M 9/082 379/406.01 |
| 2007/0064956 | A1* | 3/2007 | Iwata .................... G10L 21/038 381/61 |
| 2007/0091873 | A1* | 4/2007 | LeBlanc .................. H04B 3/23 370/352 |
| 2008/0080702 | A1 | 4/2008 | Zhang |
| 2008/0198779 | A1 | 8/2008 | Jaermyr |
| 2008/0247557 | A1 | 10/2008 | Sudo |
| 2008/0304653 | A1 | 12/2008 | Ghani |
| 2009/0103712 | A1 | 4/2009 | Frauenthal |
| 2009/0202063 | A1 | 8/2009 | Frauenthal |
| 2009/0279686 | A1 | 11/2009 | Tan |
| 2010/0322387 | A1 | 12/2010 | Cutler |
| 2011/0019833 | A1 | 1/2011 | Kuech |
| 2011/0150067 | A1 | 6/2011 | Takada |
| 2014/0162731 | A1* | 6/2014 | Helsloot ................ H04B 15/00 455/570 |

OTHER PUBLICATIONS

Sugiyama, A. et al "A Stereo Echo Canceler with Correct Echo-Path Identification Based on an Input-Sliding Technique" IEEE Transactions on Signal Processing, vol. 49, Issue 11, pp. 2577-2587, published in Nov. 2001.

Kim, J. et al. "An Inaudible Pseudonoise Sequence Generation for Digital Audio Watermarking" 14th International Conference on Advanced Communication Technology, Feb. 19-22, 2012, pp. 735-739.

* cited by examiner

ECHO CONTROL THROUGH HIDDEN AUDIO SIGNALS

CROSS-REFERENCE TO RELATED APPLICATIONS

This application claims priority to Chinese Patent Application No. 201210224441.0 filed 28 Jun. 2012 and U.S. Provisional Patent Application No. 61/674,054 filed 20 Jul. 2012, each of which is hereby incorporated by reference in its entirety.

TECHNICAL FIELD

The present document relates to echo cancellation and/or echo suppression. In particular, the present document relates to the estimation of an echo path delay and to the detection of frame drop and/or sample glitch within the echo path possibly including the reference path.

BACKGROUND

Electronic communication devices such as telephones, smartphones, etc., which may be operated in a handsfree mode, typically make use of echo cancellation and/or echo suppression in order to compensate for an echo of an audio signal rendered by a loudspeaker of the electronic device, wherein the echo may have been captured by a microphone of the electronic device. The determination of the echo path for an electronic communication device is an important part of the signal processing for an effective conversation. When a talker hears an echo of his/her voice, such echo severely disrupts the talker's ability to converse naturally.

The efficient and correct operation of echo cancellation and/or echo suppression typically depends on a constrained and reasonable variation in the echo path over time, such as is expected with movement in the device or nearby objects. Hardware and/or software faults or failures in a system can lead to the possibility of sudden discontinuities or errors in the audio signals comprising the speaker output, echo reference and input microphone signal. Such discontinuities create unnatural variation in the echo path which can cause instability and failure of echo control systems. One aspect of this document addresses the technical problem of estimating the occurrence of such faults and discontinuity events.

In some systems or applications, there may be an unknown bulk delay that occurs due to the system hardware and/or software between an audio output and associated microphone input corrupted by echo. In modeling and echo path, it is not necessary to estimate the echo present in this bulk delay period. Another aspect of this document is to address an improved method for estimating this bulk delay resulting in improved echo control stability and lower computational complexity.

SUMMARY

According to an aspect a method for determining an estimate of an effective echo path property of an echo path of an electronic device is described. It should be noted that in the present document, the term "echo path" refers to an effective or apparent echo path from within a hardware and software system. An effective echo path typically comprises the playback system (including a loudspeaker) on a playback path of the electronic device and/or the recording system (including a microphone) on a recording path of the electronic device, in addition to the acoustical echo path between the loudspeaker and the microphone of the electronic device. In other words, the effective echo path may comprise the components of the electronic device on the playback path and/or on the recording path between a point within the electronic device, where a reference signal (which is to be rendered by the electronic device) is diverted towards an Acoustic Echo Cancellation (AEC) unit and/or to an Acoustic Echo Suppression (AES) unit, and a point within the electronic device, where a recorded signal (which has been recorded by a microphone of the electronic device) enters the AEC unit and/or the AES unit. The components of the electronic device lying between those two points may be referred to as the reference path of the electronic device. In some cases, the acoustical echo path may be assumed to be relatively stable.

The electronic device may comprise a telephony function and/or an audio conferencing function. In particular, the electronic device may be configured to render a total audio signal using a loudspeaker, thereby yielding a rendered audio signal. The total audio signal which is to be rendered typically comprises a reference audio signal received at the electronic device from a remote party (e.g. from a similar remote electronic device comprising a telephony function or from a remote conference server providing the audio signals originating from other participants of the audio conference). Furthermore, the electronic device may be configured to record an echo of the rendered audio signal using a microphone, thereby yielding a recorded audio signal. The recorded audio signal may comprise an echo of the rendered audio signal. In addition, the recorded audio signal may comprise an audio signal originating from a user of the electronic device. The recorded audio signal is also referred to as a microphone signal or a captured signal in the present document.

The estimated echo path property may relate to various aspects of the echo path. In particular, the echo path property may comprise a delay of the echo path (also referred to as the echo path delay). Alternatively or in addition, the echo path property may comprise a discontinuity or a phase offset between the total audio signal which is to be rendered, and the echo of this audio signal, which is comprised within the recorded audio signal. Such a discontinuity or a phase offset on the echo path may be due to any one or more of: a drop or a repeat of a frame of the total audio signal caused by the electronic device when rendering the total audio signal and/or caused by the electronic device when recording the echo of the rendered audio signal; a glitch of a sample of the total audio signal caused by the electronic device when rendering the total audio signal and/or caused by the electronic device when recording the echo of the rendered audio signal; a mismatch between a sampling rate of the total audio signal which is to be rendered and a sampling rate of the recorded audio signal (such mismatch may be due to different clocks used for playback, i.e. for rendering, and used for recording); and a motion of the electronic device or of a nearby object impacting the echo path (leading e.g. to a Doppler effect).

The method may comprise inserting an auxiliary audio signal into the total audio signal to be rendered by the loudspeaker. The auxiliary audio signal may be inserted into the total audio signal such that the auxiliary audio signal is not audible. The total audio signal, which is to be rendered, typically comprises the reference audio signal (received from a remote party) and the auxiliary audio signal (inserted at the electronic device). Consequently, the electronic device renders (or plays back) the reference audio signal in conjunction with the auxiliary audio signal. The auxiliary audio signal is selected such that the auxiliary audio signal is not audible when being played back within the total audio signal (also comprising the reference audio signal).

The auxiliary audio signal may comprise a tonal audio signal at a first frequency. The first frequency may lie outside of a frequency range audible by a human being and/or an energy of the tonal audio signal may lie below a threshold of hearing for the first frequency. The frequency range audible by a human being may be age dependent. As such, the first frequency may be selected based on a target age range (notably a target minimum age) of the users of the electronic device. By way of example, the first frequency may be at 16 kHz or higher (e.g. at 17 kHz). It should be noted that a first frequency at e.g. 17 kHz may be considered to be within a possible hearing range of a human being (e.g. aged under 20). However, the general sensitivity of hearing at such a frequency is such that an auxiliary audio signal with sufficient energy to be detected by the microphone of the electronic device can lie below the threshold of hearing for a typical nearby user or listener. As such, the first frequency may be selected such that the tonal audio signal may have an energy sufficiently high to be recorded by the microphone of the electronic device and sufficiently low to lie below the threshold of hearing of a human being.

Furthermore, the tonal audio signal may have a bandwidth corresponding to less than 5% of the first frequency. In an example, the bandwidth of the tonal audio signal is in the range of 100 to 200 Hz. In some embodiments, this bandwidth around the center frequency (i.e. around the first frequency) is achieved by using a smooth envelope, such as a Gaussian with a width in the order of 5-20 ms, applied to the tonal reference. In some embodiments, this change in envelope may occur at an interval greater than the expected echo path length (or echo path delay), being in the range of 100-2000 ms. In some embodiments the modulation in amplitude may occur in addition to a constant continual amplitude, whilst in others the modulation of the amplitude is complete with no auxiliary audio signal present outside of the modulated tonal signal or the modulated tonal pulse. As such, the tonal audio signal may be inaudible (due to the first frequency and signal energy lying outside of the perceivable range of a human being), and the tonal audio signal may comprise a clearly confined spectral content, allowing for a reliable isolation of the tonal signal from the total audio signal and for a reliable isolation of an echo of the tonal signal from an echo of the rendered audio signal.

The method may further comprise isolating the echo of the auxiliary audio signal from the recorded audio signal. For this purpose, it may be taken into account that the auxiliary audio signal is known. As such, the echo of the auxiliary audio signal may be isolated by taking into account one or more properties of the auxiliary audio signal. The one or more properties of the auxiliary audio signal may relate to a frequency of the auxiliary audio signal and/or to a spectrum of the auxiliary audio signal and/or to a signal level of the auxiliary audio signal. In particular, isolating the echo of the auxiliary audio signal may comprise filtering the recorded audio signal using a filter. The filter may be adapted to the auxiliary audio signal. By way of example, the filter may be adapted to let pass the auxiliary audio signal while blocking frequency components not comprised within the auxiliary audio signal. In an example, the filter comprises a pass band at the first frequency (and at least one stop band at other frequencies than the first frequency). The method of filtering may comprise a digitally implemented recursive filter, known as an infinite impulse response (IIR) filter. An IIR filter may be beneficial in view of a relatively low computational complexity. Other suitable implementations of filters are generally known to those skilled in the art The method may further comprise determining the estimate of the echo path property based on knowledge of the inserted auxiliary audio signal and based on the isolated echo of the auxiliary audio signal. By way of example, the estimate of the echo path property may comprise an estimate of an echo path delay. In such cases, the tonal audio signal at the first frequency may have a pre-determined pulse length (e.g. of 20 ms or less). The pre-determined pulse length may be selected to be shorter than an expected echo path delay. Determining the estimate of the echo path delay may then comprise determining a time offset between the tonal audio signal and an echo of the tonal audio signal comprised within the isolated echo of the auxiliary audio signal. Such a time offset may be determined e.g. by starting a temporal counter upon insertion of the auxiliary audio signal (comprising the tonal signal pulse) into the total audio signal and by determining the elapsed time until the echo of the tonal signal pulse is first detected within the appropriately filtered component of the recorded audio signal.

The tonal audio signal may be amplitude modulated across a temporal length of the tonal audio signal. The temporal length of the tonal audio signal may correspond to the pre-determined pulse length. In particular, the tonal audio signal may have an amplitude peak at a temporal center of the temporal length of the tonal audio signal. Amplitude modulation and in particular an amplitude peak may be used to increase the precision of the estimate of the echo path delay. In an example, the amplitude modulation corresponds to a sinusoidal half wave across the temporal length of the tonal audio signal.

Using the inaudible auxiliary audio signal, an estimate of the echo path delay can be determined in a computationally efficient manner. The estimate of the echo path delay may be used to control a delay applied to the reference audio signal, thereby yielding a delayed reference audio signal. In particular, the reference audio signal may be delayed by the estimate of the echo path delay (rounded to a multiple of a sample or appropriate audio processing block length of the reference audio signal). In yet other words, the reference signal as provided to the AES unit and/or the AEC unit may be delayed by a value derived from the estimate of the echo path delay. As such, acoustic echo cancellation (AEC) of an audio signal derived from the recorded audio signal may be based on the delayed reference audio signal (instead of the original reference audio signal), thereby allowing the use of an AEC unit with reduced AEC filter length, i.e. thereby reducing the computational complexity of the AEC unit. In particular, the filter part of a typical AEC filter having coefficients which are substantially zero can be omitted, thereby shortening the length of the AEC filter (by maintaining only the filter part having coefficients which are substantially nonzero).

Alternatively or in addition, the estimate of the echo path property may comprise the estimate of a phase offset occurring on the echo path. In particular, the estimate of the echo path property may be configured to detect a discontinuity occurring on the (effective) echo path, possibly including components of the electronic device on the playback path and/or on the recording path. In such cases, the tonal audio signal at the first frequency may have a pre-determined observation length or may be continuous, wherein the pre-determined observation length may correspond to the length of the time period over which the discontinuity is to be detected. The observation length may include a continuous monitoring by way of at least some tonal component being always present in the auxiliary audio signal, such that any discontinuity can be detected. Determining the presence of a discontinuity and/or a potential sampling frequency shift may comprise determining an offset between the estimated instantaneous frequency of the echo of the tonal audio signal comprised within the isolated echo of the auxiliary audio signal and the first frequency.

The frequency offset may be determined using a phase-locked loop (PLL) unit configured to lock in a frequency range around the first frequency. In particular, the PLL unit may be configured to indicate deviations of the frequency of the isolated echo of the tonal audio signal from the first frequency. As such, an estimate of a discontinuity, a phase offset variation, a frequency shifting or a significant change occurring on the echo path may be determined in a computationally efficient manner. The term "phase offset" used in the present document may refer to one or more of: a discontinuity, a phase offset variation, a frequency shifting and/or a significant change occurring on the echo path.

As indicated above, the electronic device may comprise an acoustic echo cancellation (AEC) unit. Typical AEC units have a deteriorated performance in case of discontinuities occurring on the (effective) echo path (in particular on the reference path of the electronic device). In order to address such performance deteriorations, the AEC unit may be bypassed, if the estimate of the rate of occurrence and/or the extent of discontinuities exceeds a pre-determined rate threshold and/or discontinuity threshold, e.g. if the rate of detected discontinuities, and/or the extent of the deviation of the PLL tracking exceeds the pre-determined rate and frequency deviation threshold.

It should be noted that a plurality of different echo path properties may be estimated in parallel. For this purpose, the auxiliary signal may comprise a plurality of tonal signals at a plurality of different frequencies. The tonal signals may be selected as described in the present document, thereby allowing for the estimation of different echo path properties in parallel.

As indicated above, the rendered audio signal typically comprises the auxiliary audio signal and a reference audio signal. The auxiliary audio signal may comprise a signal component having an energy which lies below a masking threshold of the reference audio signal. As such, the auxiliary audio signal may be determined based on the reference audio signal. Masking techniques may be used to render the auxiliary audio signal inaudible when being played back in conjunction with the reference audio signal.

As indicated above, the electronic device may comprise an AEC unit and/or an acoustic echo suppression (AES) unit. An AEC unit typically utilizes an operational mode of signal or estimated echo subtraction, whereby the estimated echo signal is intended to exactly negate the actual echo signal present in the recorded signal (or the input signal of the AEC unit). An AES unit utilizes an operational mode of spectral subtraction, whereby the echo is reduced by attenuating spectral bands that are determined to contain a significant proportion of energy due to estimated echo. Whilst an AEC unit typically can produce an echo reduced output with less desired signal distortion, an AES unit typically provides improved robustness of operation in the presence of echo path or reference uncertainties. The echo of the auxiliary audio signal may be removed from the recorded audio signal, thereby yielding a net audio signal. The AEC unit may perform acoustic echo cancellation and/or the AES unit may perform acoustic echo suppression based on the net audio signal and based on a signal derived from the reference audio signal. As such, the AEC unit and/or the AES unit may not be affected by the insertion of the auxiliary audio signal. For this purpose, the method may utilize a blocking filter (e.g. a notch filter) having a stop band at the auxiliary signal frequency and a pass band for at least some other frequencies, thereby reducing the impact of the echo or presence of the auxiliary audio signal within the recorded signal captured by the microphone.

The method may further comprise determining an amount of noise or signal comprised within the reference audio signal at a particular time instant (e.g. at a particular sample of the reference audio signal). A signal level of the auxiliary audio signal at the particular time instant may depend on the amount of noise or signal comprised within the reference audio signal at the particular time instant. In particular, the signal level of the auxiliary audio signal may be increased as the amount of noise or signal increases and vice versa. This allows for the auxiliary audio signal to be injected at higher levels whilst being masked by the mechanism of energetic masking (possibly in addition to the auditory threshold of hearing). Such adaption of the injected auxiliary audio signal may be designed to maintaining a pre-determined signal-to-noise ratio for the auxiliary audio signal compared to other rendered audio and thus maintain the reliability of the resulting estimate of the echo path property.

According to a further aspect, a processing unit configured to determine an estimate of an echo path property of an echo path of an electronic device is described. The processing unit may be part of the electronic device. The electronic device may be configured to render a total audio signal using a loudspeaker, thereby yielding a rendered audio signal. Furthermore, the electronic device may be configured to record an echo of the rendered audio signal using a microphone, thereby yielding a recorded audio signal. The processing unit may be configured to insert, in an inaudible manner, an auxiliary audio signal into the total audio signal to be rendered by the loudspeaker. The auxiliary audio signal may comprise a tonal audio signal at a first frequency. Furthermore, the processing unit may be configured to isolate the echo of the auxiliary audio signal from the recorded audio signal. In addition, the processing unit may be configured to determine the estimate of the echo path property based on the inserted auxiliary audio signal and based on the isolated echo of the auxiliary audio signal.

According to another aspect, a method (and a corresponding processing unit) for determining an estimate of a path property of a path linking an AEC and/or AES unit to the rendered reference signal is described. In other words, the method may be directed at determining an estimate of a path property of a signal path within the electronic device, which provides the reference signal—which is to be rendered—to the AEC and/or AES unit for echo compensation and/or echo suppression. In a similar manner to the echo path properties, the path properties may comprise a path delay and/or a discontinuity (due e.g. to a frame drop or a sample glitch).

As already outlined above, the electronic device may be configured to render a total audio signal using a loudspeaker, thereby yielding a rendered audio signal. The total audio signal may comprise the reference signal. Furthermore, the electronic device may be configured to record an echo of the rendered audio signal using a microphone, thereby yielding a recorded audio signal. In addition, the electronic device may comprise an AEC and/or AES unit configured to compensate and/or suppress an echo of the reference signal comprised within the recorded audio signal. For this purpose, the electronic device may comprise a signal path to provide the reference signal to the AEC and/or AES unit. The method may be directed at estimating a path property of this particular signal path. The estimated path property may be used to improve the performance of and/or to control the AEC and/or AES unit. By way of example, an estimated delay may be taken into account to apply a bulk delay within the AEC unit. Alternatively or in addition, the detection of a discontinuity (e.g. due to a frame drop and/or a sample glitch) may be used to disable the AEC unit and/or to enable the AES unit.

The method may comprise inserting, in an inaudible manner, an auxiliary audio signal into the total audio signal to be rendered by the loudspeaker. As outlined above, the auxiliary audio signal may comprise a tonal audio signal at a first frequency. The total audio signal may comprise the reference signal and the auxiliary audio signal. The total audio signal may be transmitted over the internal signal path of the electronic device to the AEC unit and/or the AES unit. Furthermore, the method may comprise isolating the auxiliary audio signal from the total audio signal at an input of the AEC unit and/or the AES unit.

In addition, the method may comprise determining the estimate of the path property of the signal path to the AEC and/or AES unit based on the inserted auxiliary audio signal (which inserted at a beginning of the signal path to the AEC and/or AES unit) and based on the isolated auxiliary audio signal (which is isolated at an end of the signal path to the AEC and/or AES unit). As outlined in the present document, a PLL unit (in combination with a continuous tonal audio signal) may be used to detect a discontinuity on the signal path and/or a delay estimation unit (in combination with a tonal audio signal have a pre-determined pulse length) may be used to determine an estimate of the path delay.

Overall, it should be noted that the aspects described in the present document with respect to the estimation of echo path properties are also applicable to the estimation of the path properties of the signal path to the AEC and/or AES unit. Furthermore, it should be noted that the inserted auxiliary audio signal may be used in parallel for the estimation of the echo path properties and for the estimation of the path properties of the signal path to the AEC and/or AES units. For this purpose, the electronic device may comprise respective delay estimation units and/or PLL units.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1 shows an example electronic device comprising an acoustic echo cancellation unit followed by an optional acoustic echo suppression unit;

DETAILED DESCRIPTION

Figure 1:
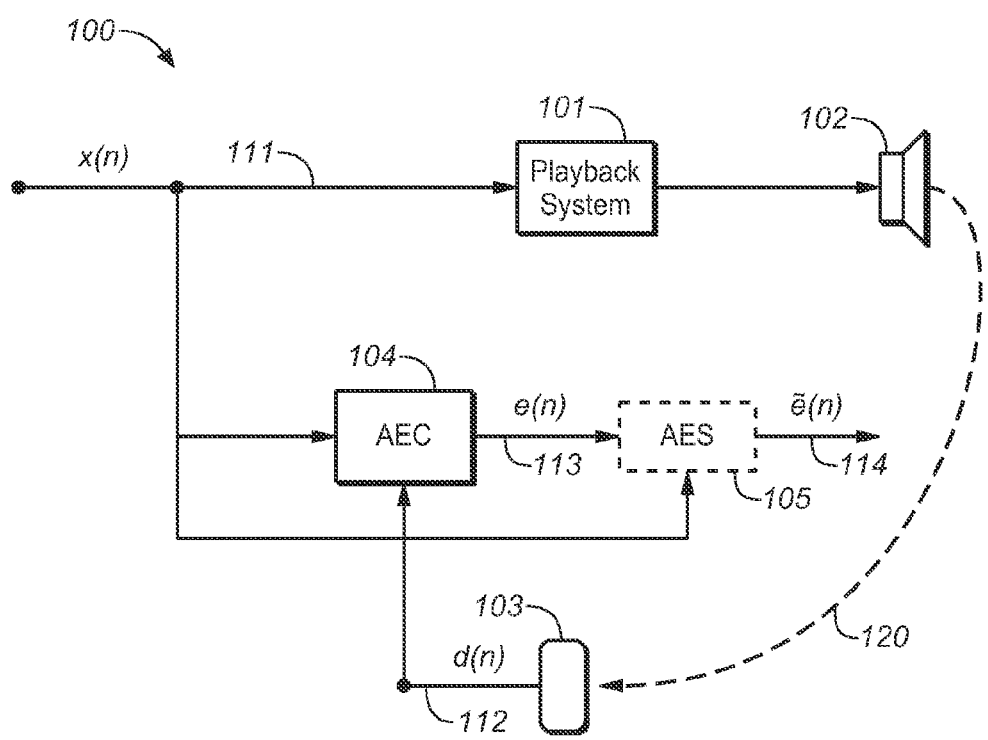

As indicated in the introductory section, electronic communication devices typically comprise acoustic echo cancellation and/or acoustic echo suppression units, in order to reduce the effects of an echo of a rendered audio signal captured by a microphone of the electronic communication device. FIG. 1 illustrates an example electronic communication device 100 (also referred to as electronic device 100 or device 100) comprising an acoustic echo cancellation (AEC) unit 104 and optionally an acoustic echo suppression (AES) unit 105. The electronic device 100 receives an audio signal $x(n)$ 111 from a remote party or corresponding to a desirable audio output, wherein the audio signal 111 is to be rendered by a loudspeaker 102 of the electronic device 100 using a playback system 101. The playback system 101 may be configured to allow for a volume control of the rendered audio signal. The rendered audio signal may be captured by the microphone 103 of the electronic device via an echo path 120. The echo path 120 typically depends on the surrounding environment of the electronic device 100 (e.g. on a room within which the electronic device 100 is placed).

The microphone 103 of the electronic device 100 captures an echo of the rendered audio signal 111, typically in combination with an acoustic signal originating from a talker at the electronic device 100. As such, the captured audio signal $d(n)$ 112 typically comprises a combination of the acoustic signal originating from a talker at the electronic device 100 (which is to be sent to the remote party) and of the echo of the rendered audio signal 111 (which is to be removed at the electronic device 100 in order to prevent an undesirable echo at the remote party). For this purpose, the captured audio signal $d(n)$ 112 may be processed by the AEC unit 104.

The AEC unit 104 may be configured to determine an estimate of the echo of the rendered audio signal 111 comprised within the captured audio signal 112 and remove (subtract) the estimate from the captured audio signal 112, thereby yielding the echo compensated audio signal $e(n)$ 113. The AEC unit 104 typically comprises a linear estimator (e.g. a linear AEC filter having a number N of filter coefficients) which is configured to determine the estimate based on the received audio signal $x(n)$ 111 (which may also be referred to as the reference signal 111). By way of example, the linear estimator may apply a linear AEC filter to the received audio signal $x(n)$ 111 to determine the estimate of the echo of the rendered audio signal 111 comprised within the captured audio signal 112. The linear estimator may be updated by repeatedly minimizing the energy of the echo compensated audio signal e(n) 113 for succeeding samples n. In other words, the AEC unit 104 may be adapted to changes of the echo path 120 on a sample-by-sample or other interval basis. The echo compensated audio signal e(n) 113 may then be transmitted by the electronic device 100 to the remote party and/or may be used as a desired audio source.

The AEC unit 104 applies linear estimation techniques, which are configured to compensate linear effects on the echo path 120. Alternatively or in addition, the electronic device 100 may comprise an acoustic echo suppression (AES) unit 105 which is configured to apply a gain, or a plurality of gains for different filtered bands or components of the echo compensated audio signal, to the echo compensated audio signal e(n) 113 (or to the captured audio signal d(n) 112). The AES unit 105 may be configured to suppress a residual echo signal comprised within the echo compensated audio signal e(n) 113. The gain or the plurality of gains applied by the AES unit 105 may be used to attenuate the echo compensated audio signal e(n) 113, if it is determined that the echo compensated audio signal e(n) 113 still comprises a substantial amount of echo within the signal or within appropriate filtered bands. As a result, an echo suppressed audio signal ẽ(n) 114 is obtained which may be transmitted by the electronic device 100 to the remote party or used as a desired audio source. By applying a gain to the echo compensated audio signal e(n) 113, the AES unit 105 is configured to account for residual echo after the AEC unit and also for nonlinear effects on the echo path, which may typically not be handled by the AEC unit 104. In some modes or methods, the AES unit may perform the majority of the echo removal due to conditions, such as discontinuities and abrupt echo path changes that may cause the AEC unit to fail. The AES unit 105 may be configured to perform a spectral analysis of the received audio signal 111 and of the echo compensated audio signal e(n) 113 thus facilitating the application of multiple gains across the associated frequency bands. Furthermore, the AES unit 105 may be configured to determine the amount of echo comprised within the echo compensated audio signal e(n) 113 based on the spectral analysis of the previously received audio signal 111 and of the echo compensated audio signal e(n) 113.

As outlined above, the AEC unit 104 typically comprises an AEC filter with a length of N filter coefficients. The length N of the filter may be rather large, in order to appropriately model and compensate for the echo path 120 (e.g. in order to model and compensate for an initial delay incurred on the echo path 120) and associated echo response. The coefficients of the AEC filter may be divided into a zero part (pure delay) and nonzero part, respectively. The zero part (having coefficients which are substantially zero) may be significantly longer than the nonzero part, and doing filtering and coefficient update for the zero part is typically unnecessary and power consuming. It is desirable to reduce the required length N of the AEC filter in order to allow for an increased robustness of the (adaptive) echo cancellation and in order to reduce the computational complexity. Furthermore, the AEC unit 104 is typically limited to the cancellation of linear effects on the echo path 120. The loss of audio frames or the occurrence of sample glitches and discontinuities on the rendering and capture path of the electronic device 100 (comprising the playback system 101, the loudspeaker 102 and the microphone 103) may lead to nonlinear effects on the echo path 120 which may not be handled appropriately by the AEC unit 104. The rendering path is also referred to as the playback path and the capture path is referred to as the recording path. It is therefore desirable to provide a reliable indicator of the presence of significant nonlinear effects and/or discontinuities on the echo path 120, wherein the indicator may be used to appropriately adapt the processing within the electronic device 100 (e.g. to bypass the AEC unit 104) in case of the presence of significant nonlinear effects on the echo path 120.

In the present document, it is proposed to utilize one or more perceptually inaudible signals to determine the properties of an electronic device 100 (e.g. an audio conferencing device), in order to improve echo correction and/or echo suppression performance and in order to reduce implementation complexity. As indicated above, an efficient and correct operation of echo cancellation and/or echo suppression typically depends on an accurate estimation of echo path properties which usually comprises the estimation of echo path delay and/or the detection of frame drop and/or sample glitch. By embedding one or more hidden, i.e. perceptually inaudible, signals into the reference signal x(n) 111 of the AEC unit 104 and/or of the AES unit 105, the abovementioned echo path properties can be determined robustly and efficiently.

A hidden or perceptually inaudible audio signal which is inserted into the reference signal x(n) 111 is referred to as an auxiliary signal in the present document. The auxiliary signal may comprise signal components which lie outside of the frequency range which is perceivable by a human being (e.g. at or above a frequency of 17 kHz). Alternatively or in addition, the auxiliary signal may be designed in dependence of the reference signal x(n) 111. By way of example, the auxiliary signal may be designed such that the auxiliary signal is masked by the reference signal x(n) 111. Alternatively or in addition, the auxiliary signal may be designed such that the auxiliary signal is close to or below the noise floor of the reference signal x(n) 111. Alternatively or in addition, the auxiliary signal may be designed based on spread spectrum techniques.

It should be noted that for the AEC unit 104 to work correctly, the reference signal x(n) 111 of the AEC unit 104 should be accurate, i.e. the reference signal x(n) 111 of the AEC unit 104 should be as close as possible to the actually rendered audio signal. Furthermore, for an accurate estimation of the echo path delay, a delay applied by the AEC unit 104 should synchronize the alignment of the input signal d(n) 112 and the reference signal x(n) 111 that are used for cancellation.

In current AEC units 104, the alignment of the reference signal x(n) 111 and the input signal d(n) 112 is typically accomplished by correlation. This means that an AEC unit 104 may perform an alignment of the reference signal x(n) 111 and the input signal d(n) 112 based on a correlation function between the reference signal x(n) 111 and the input signal d(n) 112. The correlation function (e.g. a maximum of the correlation function for a particular time offset between the reference signal x(n) 111 and the input signal d(n) 112) may provide an indication of the delay incurred by the input signal d(n) 112 on the echo path 120 (the indication being given e.g. by the particular time offset which provides the maximum correlation). The determination of the correlation function for succeeding samples or for succeeding frames of the audio signal involves high computational complexity, and also requires a degree of signal content or excitation that may not be present in the intended audio to render. It is an object of the present document to reduce the computational complexity linked to the determination of the echo path delay.

The adaptive filter lengths of the AEC unit 104 typically depend on a maximum expected echo path delay. When the delay path 120 exhibits a significant additional delay to the echo response (e.g. hundreds of milliseconds) the length of the adaptive filter within the AEC unit 104 and the computational complexity of multiplying the filter with the input signal d(n) 112 and of updating the filter coefficients on a frame-by-frame basis can be significant. On the other hand, if an average delay incurred on the echo path 120 is known via a separate mechanism, the adaptive filter lengths can be reduced to accommodate only for variations of the delay around the known average delay (also referred to as a bulk delay) and to accommodate for the expected echo response. In other words, if an estimate of an average delay of the echo path 120 can be provided, the average delay, or generally some delay slightly less than this to allow for an appropriate echo prediction by the AEC unit, can be applied by default to the input signal d(n) 112 and the AEC unit 104 may be limited to estimating and to compensating variations of the delay around the average delay, thereby reducing the required length of the adaptive filter comprised within the AEC unit 104 and thereby reducing the computational complexity of echo cancellation.

In the present document, it is proposed to estimate the echo path delay, by inserting an auxiliary signal, e.g. a modulated tone such as a tone burst of 20 ms, into the reference signal x(n) 111. The modulated tone may e.g. have a center frequency of 18 kHz which is perceptually inaudible. Furthermore, the modulated tone may have a 100-200 Hz envelope.

Figure 2A:
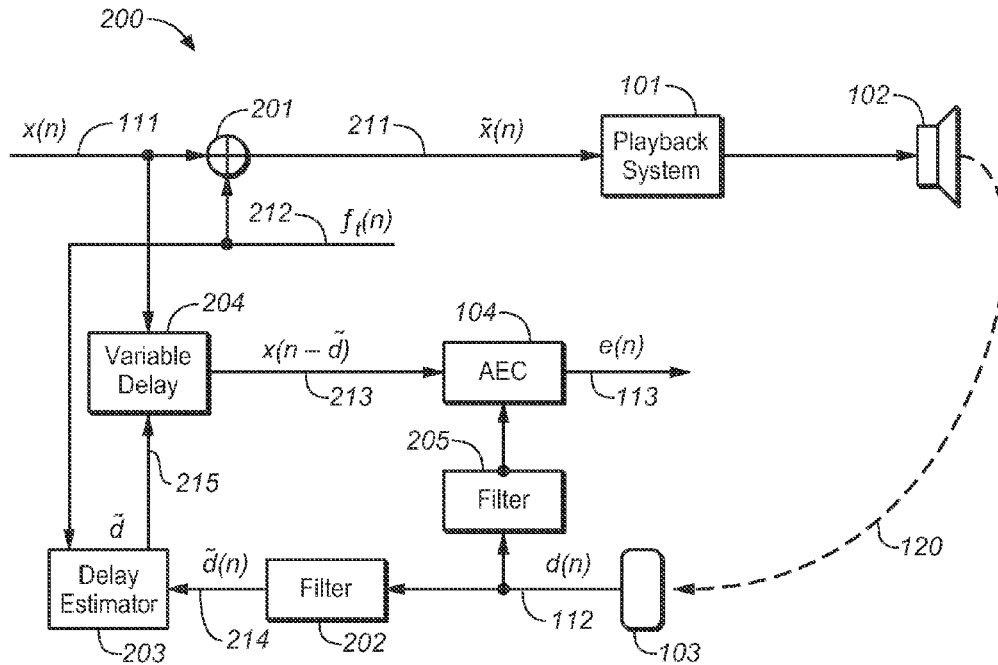
FIGS. 2a and 2b show example electronic device comprising means for estimating echo path properties.

FIG. 2a shows a system diagram of an example electronic device 200 comprising means for estimating the echo path delay based on the injection of an (inaudible) auxiliary signal. In particular, a modulated tone $f_r(n)$ 212 may be injected into the reference signal x(n) 111. The auxiliary signal $f_r(n)$ 212 may have a center frequency of 17 kHz and a Gaussian envelope of 200 Hz. The duration of the auxiliary signal $f_r(n)$ 212 may be 20 ms. The auxiliary signal $f_r(n)$ 212 may be inserted into the reference signal x(n) 111 using an adding unit 201. The combined signal $\tilde{x}(n)$ 211 is provided to the playback system 101 which ends with the loudspeaker 102 of the electronic device 200 and which renders the combined signal $\tilde{x}(n)$ 211.

The microphone 103 of the electronic device 200 records the captured signal d(n) 112 (also referred to as the recorded signal) which typically comprises an echo of the rendered audio signal (and possibly an audio signal originating from a talker or acoustic source of interest at the electronic device 200). In a similar manner to the electronic device 100 in FIG. 1, the captured signal d(n) 112 (also referred to as the input signal d(n) 112 to the AEC unit 104) is provided to the AEC unit 104 for echo cancellation. In the illustrated example, the captured signal d(n) 112 is filtered using a filter 205 configured to remove the (echo of the) auxiliary signal $f_r(n)$ 212 from the captured signal d(n) 112. The filter 205 may be a band stop filter configured to notch out the auxiliary signal $f_r(n)$ 212 component of the captured signal 112. Furthermore, the captured signal d(n) 112 is passed to a delay estimation unit 203 which is configured to determine an estimate of the echo path delay based on the auxiliary signal $f_r(n)$ 212 and based on an echo of the auxiliary signal $f_r(n)$ 212 comprised within the captured signal d(n) 112 (or comprised within a signal derived from the captured signal 112). In other words, the delay estimation unit 203 takes in the tone $f_r(n)$ 212 and the microphone signal d(n) 112 and identifies within the microphone signal d (n) 112 an information corresponding to the tone $f_r(n)$ 212. The delay estimation unit 203 may be configured to output an estimate of the echo path delay $\hat{d}$ 215 based on the above information.

The electronic device 200 may comprise a filter unit 202 for extracting the echo of the auxiliary signal $f_r(n)$ 212 from the captured signal d(n) 112 (e.g. a band pass filter). The filter unit 202 may comprise an IIR notch filter configured to isolate the (echo of the) auxiliary signal $f_r(n)$ 212. In other words, identifying the echo information of the $f_r(n)$ 212 within the microphone signal d(n) 112 can be achieved by passing the microphone signal d(n) 112 through a (band pass) filter 202 having a center frequency which is the same as the center frequency of the tone $f_r(n)$ 212. In more general terms, the electronic device 200 may comprise a filter unit 202 which is adapted to the auxiliary signal $f_r(n)$ 212 and which is configured to isolate the echo of the auxiliary signal $f_r(n)$ 212 from the microphone signal d(n) 112.

The delay estimation unit 203 may be configured to determine a delay $\hat{d}$ 215 between a first energy peak corresponding to the inserted tone $f_r(n)$ 212 (directly from the inserted tone $f_r(n)$ 212) and a second energy peak corresponding to the captured echo of the tone $f_r(n)$ 212 (from the filtered microphone signal $\tilde{d}(n)$ 214). In other words, if energy peaks are detected within the delay estimation unit 203, an estimate of the bulk delay $\hat{d}$ 215 can be obtained. The estimate $\hat{d}$ 215 of the echo path delay may then be fed into a variable delay unit 204 which is configured to delay the reference signal x(n) 111 by $\hat{d}$ or by $\hat{d}-D$ samples (where D is a reasonable reduction in the delay to ensure the AEC filter is able to causally predict all of the echo activity). In other words, the delay applied by the delay unit 204 may be selected to be smaller than the estimate $\hat{d}$ 215 of the echo path delay, in order to allow for a causal prediction of the delay variations and/or of the echo response within the AEC unit. The delayed reference signal $x(n-\hat{d})$ 213 is then better time aligned with the echo which is comprised within the microphone signal d(n) 112. As a consequence, the AEC unit 104 can now focus on the compensation of (minor) delay variations and on the compensation of the echo response.

Aligning (or synchronizing) the reference signal x(n) 111 with the microphone signal d(n) 112 typically provides a significant reduction in computational complexity in the acoustic echo cancellation unit 104. This is because the length of the adaptive filter in the AEC unit 104 can be significantly reduced, a direct result of which is reduced multiplications and additions and hence reduced power consumption of the entire electronic device 200. Furthermore, a shorter adaptive filter typically has a faster convergence time and an associated increase in stability which is an additional advantage of the proposed method for the delay adjustment and echo filter length reduction.

As indicated above, another important echo path property relates to the detection of dropped frames or sample glitches (i.e. to the detection of discontinuities within the echo path (possibly including the reference path of the electronic device)). Such dropped frames or sample glitches typically lead to nonlinear distortions and unexpected echo activity incurred by the rendered audio signal on the echo path 120, thereby deteriorating the performance of the AEC unit 104. The echo path property of dropped frames and/or of sample glitches may be due to a semi-unreliable output chain (e.g. within the playback system 101) of the electronic device or due to other instabilities in the echo path 120. Sample glitches and dropping of frames are relatively common in low audio quality systems and systems that use different clocks on the playback path (comprising the playback system 101 and the loudspeaker 102) and on the recording path (comprising the microphone 103 and analog-to-digital converters comprised within the electronic device). If the electronic device detects such an unstable echo path 120, the electronic device may choose to move from echo cancellation (in AEC unit 104) to echo suppression (in AES unit 105), the latter being more resilient to adverse echo paths (in particular to nonlinear effects occurring on the echo path 120).

In the present document, it is proposed to insert a (inaudible) auxiliary signal 212 into the reference signal 111, in order to detect nonlinear effects such as dropped frames and/or sample glitches. In particular, it is proposed to inject a pure tone 212 constantly in the reference signal 111 for the detection of dropped frames or sample glitches.

Figure 2B:
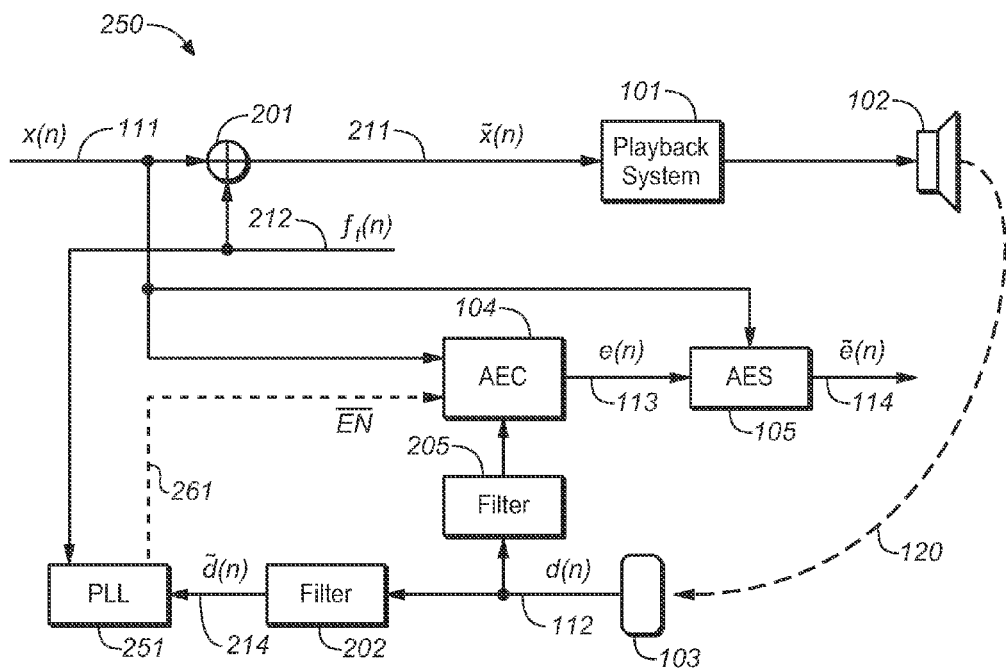

FIG. 2b illustrates a system diagram of an electronic device 250 configured to detect nonlinear effects on the echo path 120, such as dropped frames and/or samples glitches. The electronic device 250 may be configured for enabling and/or disabling the AEC unit 104 based on the detection of frame drop and/or sample glitches. As indicted above, the AEC unit 104 may not be able to appropriately process and compensate the echo of the rendered audio signal in case of nonlinear effects on the echo path 120. The acoustic echo suppressor (AES) unit 105 may then be used to (further) suppress the (residual) echo comprised in the output e(n) 113 of the AEC unit 104. In particular, the AES unit 105 is typically more robust than the AEC unit 104 to deal with real-time instabilities on the echo path 120.

A pure tone $f_r(n)$ 212, e.g. at a frequency of 18.384 kHz, may be injected constantly into the reference signal x(n) 111. A filter 202 may be used to suppress other frequency components comprised within the microphone signal d(n) 112, thereby leaving a captured echo of the tone $f_r(n)$ 212 in the filtered microphone signal $\tilde{d}(n)$ 214. A phase lock loop (PLL) unit 251 may be used to detect a frame drop or a sample glitch. In a stable situation involving no frame drops or sample glitches, the PPL unit 251 aligns the original pure tone $f_r(n)$ 212 with the echo of the tone $f_r(n)$ 212 comprised within the filtered microphone signal $\tilde{d}(n)$ 214. Consequently, the PLL unit 251 will typically output a control signal $\overline{EN}$ 261 having the value zero (or another constant value) in case no frame drops or sample glitches occur within the echo path 120. On the other hand, the PLL unit 251 typically outputs nonzero values for the control signal $\overline{EN}$ 261 if there is a frequency and/or phase variation in the filtered microphone signal $\tilde{d}(n)$ 214 as compared to the frequency and stability of the injected tone $f_r(n)$. The phase and/or frequency variations may be due to the dropping of frames along the echo path 120 or due to one or more samples that have moved.

The control signal $\overline{EN}$ 261 may be used to control the AEC unit 104. In particular, the control signal $\overline{EN}$ 261 may be used to disable or to enable the AEC unit 104. By way of example, a nonzero control signal $\overline{EN}$ 261 could be used to disable the AEC unit 104. Therefore, by using a PLL unit 251 in combination with an inaudible auxiliary signal $f_r(n)$ 212, the occurrence of frame drop and/or sample glitches can be detected in an efficient manner without the need for complex correlation calculations. By consequence, the implementation complexity for detecting the echo path property of frame drops and/or sample glitches can be significantly reduced.

It should be noted that a signal strength of the auxiliary signal 212 may be dynamically adjusted. In particular, the signal strength of the auxiliary signal 212 may be adjusted based on the reference signal 111. Even more particularly, the strength of the auxiliary signal 212 may be dynamically adjusted by using a feedback loop from a noise suppressor comprised within the playback path of the electronic device 200, 250 and/or from the PLL unit 251 and/or from the delay estimation unit 203. By way of example, when there is a relatively high amount of noise in the reference signal 111, the power of the auxiliary signal 212 may be increased for at least two reasons. Firstly, an increased power/signal level of the auxiliary signal 212 allows the echo path property estimation units (e.g. the PLL unit 251 and/or the delay estimation unit 203) to overcome the noise comprised within the reference signal 111 and to continue to operate properly. Secondly, the effective noise floor for the user is higher, and consequently an increase in the power/signal level of the auxiliary signal 212 will be masked by the relatively high noise floor.

Figure 4:
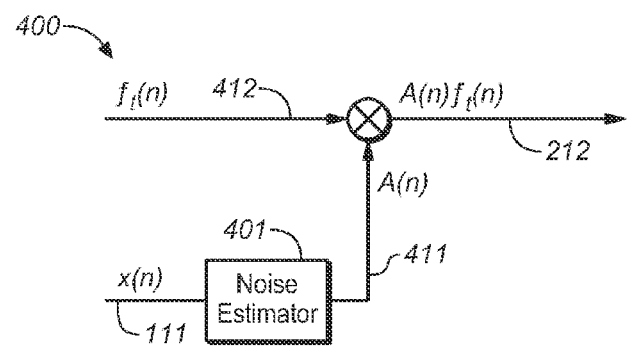
FIG. 4 illustrates a block diagram of an example generation unit for an auxiliary unit.

As such, the signal level and/or the power of the auxiliary signal 212 may be selected based on the amount of the noise comprised within the reference signal 111. This is illustrated in FIG. 4 which shows a block diagram of an example auxiliary signal generation unit 400. The auxiliary signal generation unit 400 comprises a noise estimator 401 configured to estimate the amount of noise comprised within the reference signal 111. The amount of noise comprised within the reference signal 111 may be determined based on a spectral analysis of the reference signal 111 along the time line. The noise estimator 401 may be further configured to determine a noise-dependent gain A(n) 411 being a function of the amount of noise comprised within the reference signal 111. Typically, the gain A(n) 411 increases as the amount of noise comprised within the reference signal 111 increases, and vice versa. The noise-dependent gain A(n) 411 is applied to a default auxiliary signal 412, thereby providing the noise-dependent auxiliary signal 212, which may be inserted into the reference signal 111 as described in the context of FIGS. 2a and 2b.

In other words, FIG. 4 shows the enhancement of the hidden audio signal 212 based on the noise power comprised within the reference signal 111. The noise estimator unit 401 estimates the noise floor comprised within the reference signal 111 and outputs an estimate of the amplitude A(n) 411 of the noise floor, which may be used as a gain or scaling factor for a default auxiliary signal 412. The injected signal 212 is scaled by the scaling factor 411 prior to injecting the signal 212 into the system as outlined in the context of FIGS. 2a and 2b. As a result, the signal-to-noise ratio (of the auxiliary signal) is kept at a constant (high) level, even if there is a high amount of noise comprised within the reference signal 111.

It should be noted that, alternatively or in addition, the noise comprised within the captured signal 112 may be estimated and used to estimate a noise floor. As such, the injected auxiliary signal 212 may be determined based on the estimated noise comprised within the captured signal 112, thereby taking into account an amount of noise originating from the environment of the electronic device.

Furthermore, it should be noted that the various echo path property estimation units (e.g. the PLL unit 251 and/or the delay estimation unit 203) may be implemented in a combined (single) module or in separate modules, depending on system requirements. In addition, the various echo path property estimation units (e.g. the PLL unit 251 and/or the delay estimation unit 203) may be implemented sequentially or in parallel. For example, in a parallel implementation, multiple hidden auxiliary signals 212 may be injected into the reference signal 111, where some of the multiple auxiliary signals 212 may be used for delay estimation (within the delay estimation unit 203) and others may be used for frame drop/sample glitches detection (within the PLL unit 251). In a sequential implementation, an echo path delay may be estimated first (within the delay estimation unit 203), and then, after a period of time, frame drop/sample glitch detection may be performed (within the PLL unit 251).

Figure 3:
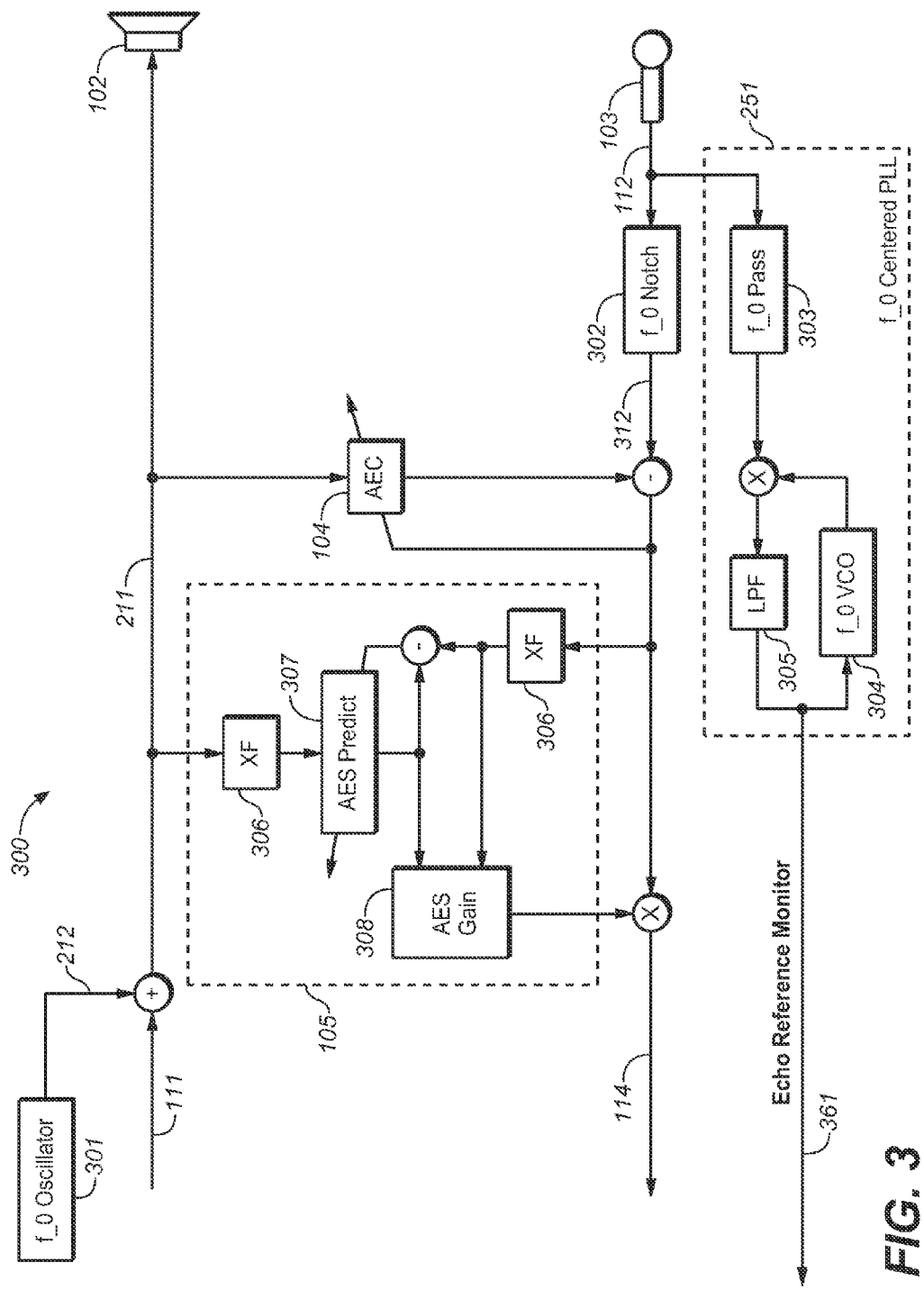
FIG. 3 shows another example electronic device comprising means for estimating echo path properties.

FIG. 3 illustrates an electronic device 300 comprising a PLL unit 251 for the detection of frame drop/sample glitches. The electronic device 300 comprises an auxiliary signal generation unit 301 (e.g. comprising the generation unit 400 of FIG. 4). In the illustrated example, the auxiliary signal generation unit 301 comprises an oscillator configured to generate a continuous tone at the frequency $f\_0$. The auxiliary signal 212 is inserted into the reference signal 111. Furthermore, FIG. 3 shows the details of an example AES unit 103. It can be seen that the AES unit 103 comprises filter banks 306 which are configured to provide spectral coefficients for the combined signal $\tilde{x}(n)$ 211 and for the microphone signal 112. In the illustrated example, the microphone signal 112 is filtered using a notch filter 302, in order to remove the echo of auxiliary signal 212 from the microphone signal, thereby providing a microphone signal 312 which does not comprise the echo of the auxiliary signal 212. The spectral coefficients may be used to determine an AES gain using an AES prediction unit 307 and an AES gain determination unit 308.

Furthermore, FIG. 3 shows the details of an example PLL unit 251. In the illustrated example, the PLL unit comprises a filter unit 303 configured to isolate the (echo of the) auxiliary signal 212 from the microphone signal 112 (wherein the filter unit 303 is e.g. a band pass filter centered at the oscillator frequency $f\_0$). The filter unit 303 corresponds to the filter unit 202 shown in FIG. 2b. In addition, the PLL unit 251 comprises a loop comprising a low pass filter 305 and a voltage controlled oscillator (VCO) 304 with a target frequency $f\_0$. The control voltage of the VCO 304 provides a signal 361 that can be monitored for variations and features that indicate different fault modes along the apparent system echo path. Appropriate processing of the control voltage of the VCO 304 (i.e. of the monitoring signal 361) may be taken to produce the AEC control signal 261. In some cases, this processing may be to enable the AEC unit when the control voltage 361 for the VCO remains within a threshold, representing 10-20 Hz, of the central or zero offset from the frequency of the injected auxiliary signal.

In some systems, the output and input processing may not occur in the same thread, process space or processing device. For such examples, a signal path which may suffer faults is present between the two processing components in order to take the signal 211 to become an input for the AEC 104 and AEC 105. It should be apparent that since the auxiliary signal has been injected into the desired rendered signal 211, a repeated instantiation of the discontinuity detection block 251 can be attached to monitor the copy of the signal 211 as received in the input processing thread or module, where the AES and AEC are executed. In some examples, where the input and output processing is attached to audio devices having different clock domains, the processing may be asynchronous in which case there should be a method of compensating for this in the path of the echo reference. Whilst a delay is rarely a problem requiring estimation, it should be apparent to those skilled in the art, that an embodiment of the present invention can additionally include the PLL or another proposed monitoring approach to detect the introduction of errors or discontinuities in the signal made available to the AEC unit and/or the AES unit. As such, it should be noted that a copy of the auxiliary signal 212 and/or of the signal 211 which is to be rendered could be provided to the PLL unit 251, in order to account for possible clocking deviations between the playback path and the recording path of the electronic device.

In other words, FIG. 3 illustrates an example system 300 using an embedded tone 212 and a PLL unit 251 to detect problems in the reference signal 111 and/or in the echo path 120 (possibly including the reference path comprising the playback system 101, the loudspeaker 102, and/or the microphone 103 within the electronic device). The frequency $f\_0$ of the tone 212 should be outside of the normal hearing range. Furthermore, the frequency $f\_0$ should not be rationally related to typical frame sizes or to the size (in number of samples) of typical processing units of the system 300. The reason for this is that if the auxiliary signal 212 comprises a frequency that is related e.g. to the frame size then it may not be possible to detect drops/rearrangements of frames or samples. As an illustrative example a 20 ms frame and a tone 212 with a 20 ms wavelength is used. If a frame is dropped (without inserting zeros) or rearranged, the tone 212 will remain continuous with no phase changes. By using a tone that is not rationally related to the frame length, this problem may be solved. In an example the frequency of the tone is $f\_0=17.352334$ kHz, with a suitable frequency range of the tone being around 16-20 kHz depending on the audio hardware response. The $f\_0$ notch filter 302 and the pass filter 303 may have a bandwidth of around 500 Hz, and the low pass filter 305 in the VCO 304 may have a bandwidth of around 1 kHz.

Figure 5:
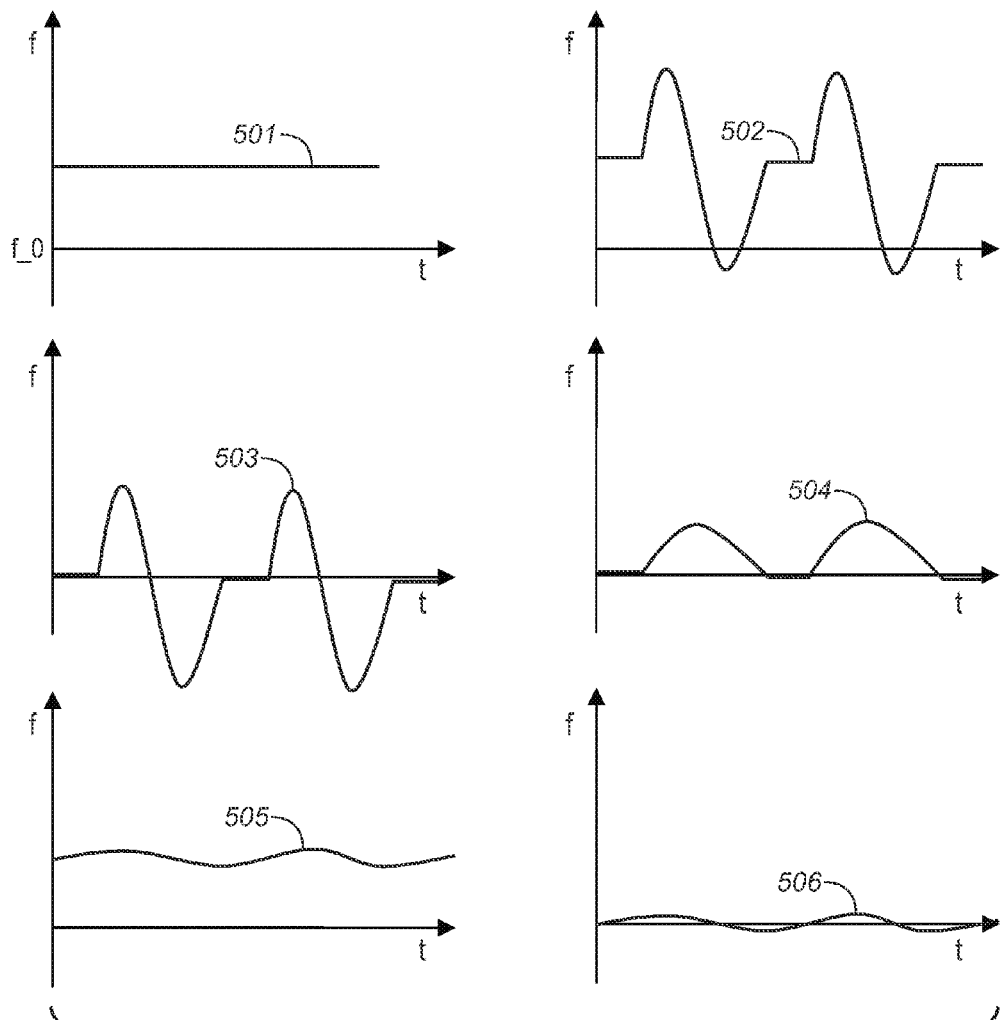
FIG. 5 illustrates example monitoring signals provided by a PLL unit as illustrated in FIGS. 2b and 3.

FIG. 5 illustrates example monitoring signals 361 which may be generated by the PLL unit 251. In other words, FIG. 5 shows example trajectories over time of the VCO control or echo reference monitor 361. A different variance around the expected value of the monitoring signal 361 indicates different kinds of problems. A random walk of the monitoring signal 361 may indicate the absence of an echo or may indicate that the echo signal does not pass the filter 303.

The monitoring signal 501 is non-zero and shows an offset from the oscillator frequency $f\_0$. Such (constant) offset from the oscillator frequency $f\_0$ may indicate a sample rate slew (or a clock mismatch) between the playback path and the recording path of the electronic device 250, 300. The oscillations of the monitoring signal 503 indicate frame drops or frame repeats, or sample glitches. The monitoring signal 502 shows the combined occurrence of sample slew and frame drops/repeats. The monitoring signal 504 indicates some form of momentary frequency shift which may be due to a Doppler effect caused by a moving device 250, 300. The slight variations of the monitoring signals 505, 506 indicate a regression instability associated with another process or stage that is attempting to resample and thus synchronize the reference and input microphone signals.

Figure 6:
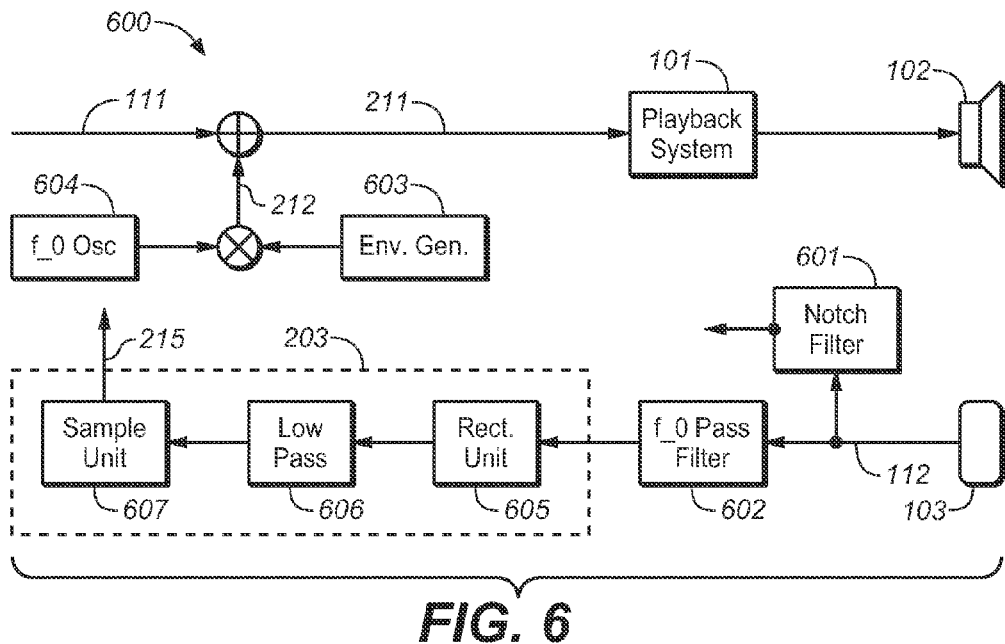
FIG. 6 shows a block diagram of an example electronic device comprising means for estimating echo path properties.

FIG. 6 illustrates a block diagram of an example electronic device 600 comprising a delay estimation unit 203. In the illustrated example, a pulse of a tone at the frequency $f\_0$ may be generated by overlaying an oscillator signal at frequency $f\_0$ (provided by the oscillator 604) with an envelope generated by the envelope generation unit 603. By way of example, the pulse may have a total length of 20 ms and may have the shape of a sinusoidal half wave (the peak of the pulse being located at a reference time instant zero). The pulse may be injected into the reference signal 111 as an auxiliary signal 212. As such, a modulated pulse 212 is passed into the speaker feed of the electronic device 300 at the frequency $f\_0$ ($f\_0$ being typically around 17 kHz).

Figure 7:
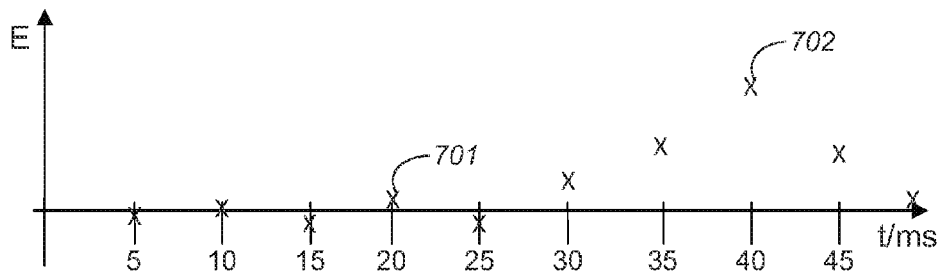
FIG. 7 shows example sampling results for determining an estimate of an echo path delay.

On the recording path, the electronic device 600 may comprise a notch filter 601 which may be configured to remove the (echo of the) auxiliary signal 212 from the microphone signal 112. As such, the AEC unit 104 and/or the AES unit 105 (not illustrated) may operate on the microphone signal from which the auxiliary signal 212 has been removed. Furthermore, the electronic device 600 may comprise a band pass filter 602 (e.g. with a bandwidth of 500 Hz) which is configured to isolate the (echo of the) auxiliary signal from the microphone signal 112 (in a similar manner to the filter 202 in FIG. 2a). The delay estimation unit 203 may comprise a rectifier unit 605 (configured to rectify the isolated echo of the auxiliary signal, e.g. using an abs-function or a square-function), a low pass filter 606 (e.g. with a cut off frequency of 100 Hz) and a sampling unit 607 (e.g. with a sampling rate of 200 Hz). The rectifier unit 605 and the low pass filter 606 may together form an amplitude detector. The detected amplitude may be sampled using sampling unit 607, and a peak and the position of the peak may be detected from the samples to provide an estimate of the delay. As such, a pass band filter 602 and an enveloped filter may be used to detect the echo path delay. As a result, a sequence of samples 701 is obtained at the output of the sampling unit 607 (as illustrated in FIG. 7). It can be seen that (along with the detection of the echo of the auxiliary signal 212), the samples take on non-zero amplitude values. A maximum amplitude value 702 indicates the presence of the peak of the echo of the auxiliary signal. The time offset of the peak of the echo of the auxiliary signal 212 compared to the peak of the original auxiliary signal 212 provides an estimate 215 of the echo path delay (40 ms in the illustrated example). It should be noted that the estimation of the echo path delay may be performed regularly or upon appropriate events.

Figure 8:
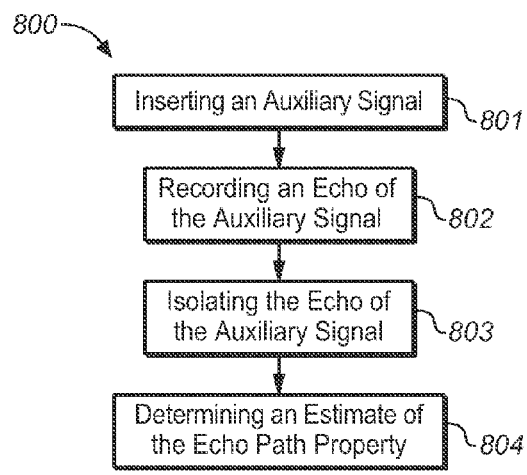
FIG. 8 shows a flow diagram of an example method for estimating an echo path property.

FIG. 8 illustrates a flow chart of an example method 800 for determining an estimate of an echo path property of an electronic device 200, 250, 300, 600. The method 800 comprises inserting 801 an audible auxiliary signal 212 into the playback path of the electronic device, wherein the auxiliary signal 212 is to be rendered by a loudspeaker 102 of the electronic device. The method 800 proceeds in recording 802 a microphone signal 112 using a microphone 103 of the electronic device, wherein the microphone signal 112 may comprise an echo of the rendered auxiliary signal 212. The method 800 may further comprise isolating 803 the (echo of the) auxiliary signal 212 from the microphone signal 112 using isolation means 202, 303, 602 (e.g. a filter), wherein the isolation means are adapted to properties of the auxiliary signal 212. In addition, the method 800 comprises determining 804 the estimate of the echo path property based on the isolated echo of the auxiliary signal 212 and based on the originally inserted auxiliary signal 212.

By way of example, the echo path property may relate to an echo path delay. In such cases, an estimate of the echo path delay may be determined using an inaudible tone at a frequency f_0 within a frequency range which is not audible to a human being. The frequency f_0 may nonetheless be close to the frequency range audible for human beings, in order to ensure that the estimated echo path delay is similar to the echo path delay incurred by the reference signal 111. The estimate of the echo path delay may be determined using a delay estimation unit 203 as described in the present document. Alternatively or in addition, the echo path property may relate to a sample drop/repeat or to a sample glitch. Such situations may be detected using a pulsed tone at a frequency f_0 as an auxiliary signal. Furthermore, such situations may be detected using a PLL unit 251 as described in the present document.

It should be noted that the methods and systems described in the present document may also be applicable to MIMO (Multiple Input Multiple Output) echo systems. In such MIMO echo systems there may be a plurality of loudspeakers 102 and/or a plurality of microphones 103. The plurality of loudspeakers 102 may be configured to render different channels of a multi-channel audio signal (e.g. a stereo or a 5.1 signal). In a similar manner, the plurality of microphones 103 may be configured to capture a multi-channel audio signal. In such cases, the methods and systems described in the present document may be configured to insert, in an inaudible manner, respective auxiliary audio signals into the respective total audio signals to be rendered by respective loudspeakers of the plurality of loudspeakers. By way of example, respective auxiliary audio signals may be inserted into the plurality of channels of a multi-channel audio signal. The respective auxiliary audio signals may be different from one another. By way of example, the respective auxiliary audio signals may comprise respective tonal signals within different frequency bands (e.g. at different first frequencies). Alternatively or in addition, the respective auxiliary audio signals may use different spreading codes.

Furthermore, the methods and systems described in the present document may be configured to isolate the echoes of the plurality of auxiliary audio signals from one or more recorded audio signals (which have been recorded using a corresponding one or more microphones). In case of a plurality of recorded audio signals, a corresponding plurality of sets of echoes may be determined. In other words, the echoes of the plurality of auxiliary audio signals may be isolated from each of the plurality of recorded audio signals. An estimate of an echo path property may be determined based on the plurality of inserted auxiliary audio signals and based on the (sets of) isolated echoes of the plurality of auxiliary audio signals. For this purpose, MIMO processing techniques may be used.

As already outlined above, the present document is not limited to the estimation of the properties of an acoustic echo path. Faults and discontinuities may occur on the playback path and/or on the recording path of an electronic device, especially when the separate paths are tied to audio components that are not synchronous. Furthermore, faults and discontinuities may occur when providing a reference signal to an AEC unit or an AES unit. Hence, discontinuity detection can be applied to an incoming reference signal. Even though there may be no strict 'echo' on the signal path, the signal may be a delayed and possibly modified version of the ideal reference signal. Detecting sudden changes in this path relative to the ideal reference is also valuable, and may be achieved by the methods and systems described in the present document.

In the present document, methods and systems for determining an estimate of an echo path property have been described. These methods and systems allow for a robust and efficient determination of such estimates. In particular, the methods and systems allow for a significant reduction of the computational complexity typically linked to the determination of such estimates. Furthermore, the computational complexity of echo cancellation and/or echo suppression within an electronic device can be reduced, while at the same time increasing the perceptual quality of the echo compensated/suppressed audio signal.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

What is claimed is:

1. A method for determining an estimate of an echo path property of an echo path of an electronic device configured to render a total audio signal using a loudspeaker, thereby yielding a rendered audio signal, and configured to record an echo of the rendered audio signal using a microphone, thereby yielding a recorded audio signal; the electronic device comprising an acoustic echo cancellation unit; the method comprising:
   inserting, in an inaudible manner, an auxiliary audio signal into the total audio signal to be rendered by the loudspeaker; wherein the auxiliary audio signal comprises a tonal audio signal at a first frequency;
   isolating the echo of the auxiliary audio signal from the recorded audio signal;
   determining the estimate of the echo path property based on the inserted auxiliary audio signal and based on the isolated echo of the auxiliary audio signal, the estimate of the echo path property being suitable for detecting a discontinuity occurring on the echo path;
   using the estimate of the echo path property to determine at least one of
      an estimate of a rate of occurrence of discontinuities occurring on the echo path, and
      an estimate of the extent of discontinuities occurring on the echo path; and
   bypassing the acoustic echo cancellation unit if the estimate of the rate of occurrence of discontinuities exceeds a pre-determined rate threshold or if the estimate of the extent of discontinuities exceeds a pre-determined discontinuity threshold.

2. The method of claim 1, wherein
   the first frequency lies outside of a frequency range audible by a human being, e.g. wherein the first frequency is at 17 kHz or higher; or
   a signal level of the tonal audio signal lies below a threshold of hearing of a human being at the first frequency.

3. The method of claim 1, wherein
   the rendered audio signal comprises the auxiliary audio signal and a reference audio signal; and
   the auxiliary audio signal comprises a signal component with an energy below a masking threshold of the reference audio signal.

4. The method of claim 3, further comprising
   removing the echo of the auxiliary audio signal from the recorded audio signal, thereby yielding a net audio signal; and
   performing at least one of acoustic echo cancellation or acoustic echo suppression based on the net audio signal and based on the reference audio signal.

5. The method of claim 3, wherein
   the method further comprises determining an amount of noise comprised within the reference audio signal at a particular time instant; and
   a signal level of the auxiliary audio signal at the particular time instant depends on the amount of noise comprised within the reference audio signal at the particular time instant.

6. The method of claim 1, wherein isolating the echo of the auxiliary audio signal comprises filtering the recorded audio signal using a filter with a pass band at the first frequency.

7. The method of claim 1, wherein
   the estimate of the echo path property comprises an estimate of an echo path delay;
   the tonal audio signal at the first frequency has a pre-determined pulse length; and
   determining the estimate of the echo path delay comprises determining a time offset between the tonal audio signal and an echo of the tonal audio signal comprised within the isolated echo of the auxiliary audio signal.

8. The method of claim 7, wherein
   the pre-determined pulse length is shorter than an expected echo path delay;
   the tonal audio signal is amplitude modulated across a temporal length of the tonal audio signal;
   the tonal audio signal has an amplitude peak at a temporal center of the temporal length of the tonal audio signal; or
   the amplitude modulation corresponds to a sinusoidal half wave across the temporal length of the tonal audio signal.

9. The method of claim 7, further comprising
   delaying a reference audio signal comprised within the total audio signal which is to be rendered, based on the determined estimate of the echo path delay, thereby yielding a delayed reference audio signal; and
   performing acoustic echo cancellation of an audio signal derived from the recorded audio signal, based on the delayed reference audio signal.

10. The method of claim 1, wherein
    determining the estimate of the echo path property comprises determining a frequency offset between an echo of the tonal audio signal comprised within the isolated echo of the auxiliary audio signal and the first frequency.

11. The method of claim 10, wherein the discontinuity occurring on the echo path is due to any one or more of:
    a drop or a repeat of a frame of the total audio signal caused by the electronic device when rendering the total audio signal;
    a drop or a repeat of a frame of the total audio signal caused by the electronic device when recording the echo of the rendered audio signal;
    a glitch of a sample of the total audio signal caused by the electronic device when rendering the total audio signal;
    a glitch of a sample of the total audio signal caused by the electronic device when recording the echo of the rendered audio signal;
    a mismatch between a sampling rate of the total audio signal which is to be rendered and a sampling rate of the recorded audio signal; and
    a motion of the electronic device impacting the echo path.

12. The method of claim 10, wherein the frequency offset is determined using a phase-locked loop, referred to as PLL, unit configured to lock to the first frequency.

13. The method of claim 10, wherein
    bypassing the acoustic echo cancellation unit if the estimate of the extent of discontinuities exceeds a pre-determined discontinuity threshold comprises bypassing the acoustic echo cancellation unit if the determined frequency offset exceeds a pre-determined frequency offset threshold.

14. The method of claim 1, wherein
the tonal audio signal has at least one of a bandwidth corresponding to less than 5% of the first frequency or a Gaussian spectral envelope across its bandwidth.

15. The method of claim 1, wherein the auxiliary audio signal comprises a plurality of tonal signals at a plurality of different frequencies.

16. The method of claim 1, wherein the electronic device further comprises an acoustic echo suppression unit and the method further comprises choosing, when bypassing the acoustic echo cancellation unit, to move from echo cancellation in the acoustic echo cancellation unit to echo suppression in the acoustic echo suppression unit.

17. A processing unit configured to determine an estimate of an echo path property of an echo path of an electronic device, the electronic device comprising an acoustic echo cancellation unit; wherein the electronic device is configured to render a total audio signal using a loudspeaker, thereby yielding a rendered audio signal, and wherein the electronic device is configured to record an echo of the rendered audio signal using a microphone, thereby yielding a recorded audio signal; wherein the processing unit is configured to
insert, in an inaudible manner, an auxiliary audio signal into the total audio signal to be rendered by the loudspeaker; wherein the auxiliary audio signal comprises a tonal audio signal at a first frequency;
isolate the echo of the auxiliary audio signal from the recorded audio signal; and
determine the estimate of the echo path property based on the inserted auxiliary audio signal and based on the isolated echo of the auxiliary audio signal, the estimate of the echo path property being suitable for detecting a discontinuity occurring on the echo path;
use the estimate of the echo path property to determine at least one of
an estimate of a rate of occurrence of discontinuities occurring on the echo path, and
an estimate of the extent of discontinuities occurring on the echo path; and
bypass the acoustic echo cancellation unit if the estimate of the rate of occurrence of discontinuities exceeds a pre-determined rate threshold or if the estimate of the extent of discontinuities exceeds a pre-determined discontinuity threshold.

18. The processing unit of claim 17, wherein the electronic device further comprises an acoustic echo suppression unit and the method further comprises choosing, when bypassing the acoustic echo cancellation unit, to move from echo cancellation in the acoustic echo cancellation unit to echo suppression in the acoustic echo suppression unit.

19. A non-transitory storage medium comprising a software program adapted for execution on a processor and for performing the method steps of claim 1 when carried out on a computing device.

* * * * *